(12) United States Patent
Kim et al.

(10) Patent No.: US 12,141,433 B2
(45) Date of Patent: Nov. 12, 2024

(54) SYSTEM FOR PROVIDING INTERACTIVE PARTICIPATION-TYPE DRAWING MAKING SERVICE AND METHOD FOR CONTROLLING THE SAME

(71) Applicant: I-Scream arts Co., Ltd., Seoul (KR)

(72) Inventors: Jong-min Kim, San Jose, CA (US); Seung-ah Kim, Sejong (KR)

(73) Assignee: I-Scream arts Co., Ltd., Seoul (KR)

( * ) Notice: Subject to any disclaimer, the term of this patent is extended or adjusted under 35 U.S.C. 154(b) by 43 days.

(21) Appl. No.: 17/916,259

(22) PCT Filed: Nov. 16, 2021

(86) PCT No.: PCT/KR2021/016771
§ 371 (c)(1),
(2) Date: Sep. 30, 2022

(87) PCT Pub. No.: WO2022/255571
PCT Pub. Date: Dec. 8, 2022

(65) Prior Publication Data
US 2023/0325070 A1 Oct. 12, 2023

(30) Foreign Application Priority Data

May 31, 2021 (KR) .......................... 10-2021-0070154
Nov. 12, 2021 (KR) .......................... 10-2021-0155876

(51) Int. Cl.
*G06F 3/04883* (2022.01)
*G06F 3/0346* (2013.01)
(Continued)

(52) U.S. Cl.
CPC ........ *G06F 3/04883* (2013.01); *G06F 3/0346* (2013.01); *G06F 3/04817* (2013.01);
(Continued)

(58) Field of Classification Search
CPC ............... G06F 3/04883; G06F 3/0346; G06F 3/04817; G06F 3/04845; G06F 3/04847;
(Continued)

(56) References Cited

U.S. PATENT DOCUMENTS

2001/0035869 A1* 11/2001 Ikeda ..................... G06F 3/0488
345/619
2004/0174365 A1* 9/2004 Bub ........................ G06T 13/80
345/473
(Continued)

FOREIGN PATENT DOCUMENTS

JP 2004110714 A 4/2004
JP 2004139289 A 5/2004
(Continued)

*Primary Examiner* — Matthew Ell
*Assistant Examiner* — Alvaro R Calderon, IV
(74) *Attorney, Agent, or Firm* — NKL Law; Jae Youn Kim

(57) ABSTRACT

The present disclosure relates to a system for providing an interactive participation-type drawing making service, which provides a remote drawing making service that is capable of real-time interaction between a first user and a second user in a contactless environment, wherein the system includes: a first terminal that is capable of inputting a first event signal of the first user; a second terminal that is capable of inputting a second event signal of the second user; a control part that constructs a network with the first and second terminals and a web, generating a server module for using a pre-stored drawing making program while undergoing communication, reflects all of each data resulting from real-time input of the first and second event signals to the drawing making program in real time, when both of the first and second terminals connect to the generated server module, and controls a preset alarm signal so as to be output in response to a result of reflection; and an alarm part that is equipped to the first and second terminals, performing visual (Continued)

displaying on an arbitrary screen according to the alarm signal output from the control part. Hereby, it is capable of implementing an interaction-type drawing making environment in such a fashion of interaction where the multilateral participants are able to draw and complete one drawing and accordingly increasing artistic competency in a more interesting making environment.

7 Claims, 13 Drawing Sheets

(51) Int. Cl.
| | | |
|---|---|---|
| *G06F 3/04817* | (2022.01) | |
| *G06F 3/04845* | (2022.01) | |
| *G06F 3/04847* | (2022.01) | |
| *G06F 3/0488* | (2022.01) | |
| *G06T 11/00* | (2006.01) | |
| *G06T 11/20* | (2006.01) | |
| *G09B 5/02* | (2006.01) | |
| *G09B 11/00* | (2006.01) | |
| *H04L 65/401* | (2022.01) | |

(52) U.S. Cl.
CPC ...... *G06F 3/04845* (2013.01); *G06F 3/04847* (2013.01); *G06F 3/0488* (2013.01); *G06T 11/001* (2013.01); *G06T 11/203* (2013.01); *G09B 5/02* (2013.01); *G09B 11/00* (2013.01); *H04L 65/4015* (2013.01); *G06T 2200/24* (2013.01)

(58) Field of Classification Search
CPC .... G06F 3/0488; G06T 11/001; G06T 11/203; G06T 2200/24; G06T 11/60; G06T 13/80; G09B 5/02; G09B 11/00; G09B 11/10; H04L 65/4015; G06Q 10/101; G06Q 50/10; G06Q 50/40; Y02P 90/30
See application file for complete search history.

(56) References Cited

U.S. PATENT DOCUMENTS

| | | | | |
|---|---|---|---|---|
| 2012/0066577 | A1* | 3/2012 | Saini | G06F 16/9577 715/211 |
| 2013/0031463 | A1* | 1/2013 | Jaeger | G06F 3/0488 715/234 |
| 2013/0173689 | A1* | 7/2013 | Stonefield | G06F 3/0346 709/203 |
| 2014/0026036 | A1* | 1/2014 | Jaeger | G06F 3/017 715/234 |
| 2015/0341399 | A1* | 11/2015 | Lee | H04L 67/1044 715/255 |
| 2017/0331952 | A1* | 11/2017 | Rogers | H04W 4/02 |
| 2018/0095653 | A1* | 4/2018 | Hasek | G06F 3/04883 |
| 2018/0227341 | A1* | 8/2018 | Rizzi | H04L 65/4015 |
| 2019/0121498 | A1* | 4/2019 | Jakobovits | G06F 3/0482 |
| 2022/0292745 | A1* | 9/2022 | Bahk | G06T 11/40 |

FOREIGN PATENT DOCUMENTS

| | | | | |
|---|---|---|---|---|
| KR | 20130127704 A | * | 5/2012 | ............... H04N 7/14 |
| KR | 20130115220 A | | 10/2013 | |
| KR | 20150066687 A | | 6/2015 | |
| KR | 20200110292 A | | 9/2020 | |

* cited by examiner

SYSTEM FOR PROVIDING INTERACTIVE PARTICIPATION-TYPE DRAWING MAKING SERVICE AND METHOD FOR CONTROLLING THE SAME

TECHNICAL FIELD

The present disclosure relates to a system for providing an interactive participation-type drawing making service and a method for controlling the same, which visually share respective drawing making processes performed by multilateral participants in a contactless environment mutually in real time, simultaneously with implementing an interaction-type drawing making environment in such a fashion of interaction where the multilateral participants are able to draw and complete one drawing through a configuration that allows real-time editing the other party's drawing that is in real-time making, thereby increasing artistic competency in a more interesting drawing making environment.

DESCRIPTION OF RELATED ART

Generally, a web-based documentation service refers to a service interworking a prescribed document editing server and an electronic terminal device with a network, and supporting documentation through a web editor when executing the web editor on a browser by driving the browser of the electronic device by a user.

At this time, in the document editing server, stored is document data of a document that is being prepared through the electronic terminal. When the user applies an editing command for the document in the electronic terminal device through the web editor, the editing command is transmitted to the document editing server and reflected to the document data stored in the document editing server, thereby maintaining the document that is being prepared in the electronic terminal device and the document data that is stored in the document editing server to be in a same editing state.

Since, the document editing server exists which stores document data having the same editing state as a document that is being prepared in an electronic device, i.e., client's side, this web-based documentation service is capable of interworking the document editing server and several electronic terminal devices to provide a function that allows several users to edit one document at the same time. However, a problem resulting from conflicts among commands applied by the respective users may occur in an editing environment where several users edit the document at the same time.

For example, when user 1 and user 2 apply editing commands to a same object among objects such as a figure, an image, a table, etc. inserted in a document, at the same time, it is necessary to solve how to apply those editing commands.

Therefore, in a case of the web-based documentation service, it is needed to study a technique for normally supporting coediting a document among several users.

Meanwhile, Edtech startups are growing in various fields of a customized learning service, game-based learning, foreign language education, coding education, etc., based on their own technical skills.

Particularly, as delaying starting a new semester due to COVID-19 challenges and increasing interests in contactless education, relevant industries are rapidly coping with expansion of Edtech. Domestic educational services and Edtech startups provide students affected by COVID-19 challenges with their own services free to attract potential customers.

Accordingly, art-education industries are adopting a remote (i.e. on-line) art education system. Also, the remote art-education system cannot exclude a solution for normally supporting coediting a drawing document among several users.

DISCLOSURE OF INVENTION IN DETAIL

Technical Problem

Therefore, the present disclosure is contrived to solve the aforementioned problems, visually sharing respective drawing making processes performed by multilateral participants mutually in a contactless environment simultaneously with implementing an interaction-type drawing making environment in such a fashion of interaction where the multilateral participants are able to draw and complete one drawing through a configuration that allows real-time editing the other party's drawing that is in real-time making, thereby increasing artistic competency in a more interesting drawing making environment.

However, technical solutions to be achieved by the present disclosure are not limited to the aforementioned solutions, and other not-mentioned technical solutions may be clearly understood by the skilled person in the art to which the present disclosure pertains from the description below.

Technical Solutions

According to one embodiment of the present disclosure as a technical manner for achieving the aforementioned solutions, provided is a system for providing an interactive participation-type drawing making service, which provides a remote drawing making service that is capable of real-time interaction between a first user and a second user in a contactless environment, wherein the system may include: a first terminal that is configured to allow inputting a first event signal of the first user; a second terminal that is configured to allowing inputting a second event signal of the second user; a control part that generates a server module for using a pre-stored drawing making program while undergoing communication in the server module by constructing a network with the first and second terminals and a web, and reflects all of each data resulting from real-time input of the first and second event signals to the drawing making program in real time when both of the first and second terminals connect to a generated server module, and controls a preset alarm signal so as be output in response to a result of reflection; and an alarm part that is equipped to the first and second terminals, performing visual displaying on an arbitrary screen according to an alarm signal output from the control part.

Further, the drawing making program may be a graphic software configured to support an environment for performing drawing making using a drawing tool that is capable of a pictorial expression of at least one of a dot, a line, a color, light, texture, and a sense of volume on canvas.

Further, the event signal may include: a making signal that expresses a drawing while generating any one stroke of dragging and a touch (click) to a canvas region following selecting each icon forming the drawing tool on the drawing making program; and a layer generating signal that demands for partitioning the canvas region on the drawing making program into a plurality of layers corresponding to the number of the terminals.

Further, the control part may include: a server module management part that generates and manages a server module for using the drawing making program, and assigns identification information for each of the first and second terminals when the first terminal and the second terminal connect to the server module; a data generating part that performs datafication of the first and second event signals that were input from the first and second terminals; a database part that pre-stores and manages the drawing making program for making a real-time response according to data of the first and second event signals generated by the data generating part; a data processing part that performs mapping of the data of the first and second event signals generated by the data generating part to identification information assigned by the server module management part, so as to reflect the data to the drawing making program; and an alarm signal output part that controls a preset alarm signal to be output in response to a result of reflection through the data processing part.

Further, when data of the layer generating signal is included in data of an event signal mapped through the data processing part, the alarm signal output part may output an alarm signal so as to provide a screen partitioned corresponding to the layer to the alarm part of the terminal into which a relevant event signal was input.

Further, the control part further may include the control part further comprises a video recording part that performs datafication of the screen displayed through the alarm part and records and stores data in the database part. The event signal further comprises a repay-demand signal that demands for replaying a video of a drawing making process already performed on the drawing making program. When data of the replay-demand signal is included in the data of the event signal mapped through the data processing part, the alarm signal output part outputs an alarm signal so as to provide, as a video, the already performed, drawing making process to the alarm part of the terminal into which a relevant event signal was input based on the data stored in the database part through the video recording part.

Further, the drawing making program may be configured allow setting a thickness for a first icon that expresses a formative element for a dot, a line and a face those having an arbitrary thickness in the drawing tool according to the event signal. The setting of a thickness may be achieved by a stroke touching (clicking) the first icon. The alarm signal output part may output an alarm signal so as to provide the alarm part with a screen on which a size of the first icon was activated corresponding to a dimension of a set thickness.

Further, the drawing making program may be configured to allow setting a color for a second icon that express a formative element for a color in the drawing tool according to the event signal. The setting of a color may be achieved by firstly touching (clicking) the second icon and then secondarily touching (clicking) a desired color. The alarm signal output part may output an alarm signal so as to provide the alarm part with a screen on which at least a part of icons of the drawing tool including the second icon was activated to be a same color as a set color.

Further, each of the first terminal and the second terminal may be further equipped with: an image sensor that takes each image from the first and second users, respectively; a voice sensor that senses each voice of the first and second users, respectively; and a sound output part that outputs a preset sound according to the alarm signal output from the control part. The control part may further include a data communication part that allows real-time mutual sharing of image data taken by the image sensor and voice data sensed by the voice sensor between the first and second terminals using a pre-mounted video calling SDK (interface) and outputs the image data to the alarm part via the alarm signal output part and the voice data to the sound output part.

Further, the alarm signal output part may output an alarm signal so as to provide the alarm part with a screen on which real-time images taking the first and second users are overlapped in a canvas region on the drawing making program, based on image data shared through the data communication part. An overlapped, real-time image may be configured to be located on an edge of the canvas region automatically, and when a stroke dragging a part occurs, this is also configured to be movable within the canvas region in response thereto.

Meanwhile, according to one embodiment of the present disclosure as a technical manner for achieving the aforementioned solutions, provided is a method for providing an interactive participation-type drawing making service, which provides a remote drawing making service that is capable of real-time interaction between a first user and a second user in a contactless environment, wherein the method may include steps of: Step a: generating a server module for using a pre-stored drawing making program by a control part; Step b: connecting both of a first terminal of the first user and a second terminal of the second user to a server module generated in the Step a; Step c: inputting either a first event signal of the first user through the first terminal or a second event signal of the second user through the second terminal to the control part, alternatively inputting both of the first and second event signals; Step d; reflecting all of each data according to real-time input of the first and second event signals to the drawing making program in real time and controlling a preset alarm signal so as to be output in response to a result of reflection, by the control part; and Step e: performing visual displaying on an arbitrary screen according to an alarm signal output by the control part, by an alarm part.

Further, the Step d may further include steps of: Step d-1: determining whether data of a layer generating signal demanding for partitioning a canvas region on the drawing making program into a plurality of layers corresponding to the number of the terminal(s) is included within data of the event signal or not, by the control part; and Step d-2: when determining that data of the layer generating signal is included, outputting a second alarm signal by the control part, so as to provide a screen partitioned corresponding to the layer to an alarm part of the terminal(s) into which a relevant event signal was input.

Advantageous Effect

According to the present disclosure, it is capable visually sharing respective drawing making processes performed by multilateral participants mutually in a contactless environment simultaneously with implementing an interaction-type drawing making environment in such a fashion of interaction where the multilateral participants are able to draw and complete one drawing through a configuration that allows real-time editing the other party's drawing that is in real-time making, thereby increasing artistic competency in a more interesting drawing making environment.

Further, according to the present disclosure, when applying a 1:1 teaching and learning-type to a teacher and a learner through a control part so as to provide each user with respective making spaces by dividing a canvas region displayed on a screen of an alarm part into a plurality of layers. Further, when applying this type to a peer group, it is capable of a customized art teaching and learning and expanding the extent of an artistic expression by sharing each other's drawings.

In addition, according to the present disclosure, it is capable of visually sharing a drawing making process mutually in real time as well as a good communication through a configuration allowing a multilateral video call. Further, it is capable of more efficiently achieving the customized art teaching and learning with a configuration allowing providing a replay video for an already performed, drawing making process.

Furthermore, according to the present disclosure, as changing setting of an attribute of an icon forming a drawing tool by a simple motion (stroke) of a user, the user is capable of making a drawing more readily and easily in a making environment having improved visibility through a configuration definitely showing a changed setting state.

However, advantageous effects to be obtained by the present disclosure are not limited to the aforementioned effects, and other not-mentioned advantageous effects may be clearly understood by the skilled person in the art to which the present disclosure pertains from the description below.

BEST MODE OF THE INVENTION

Hereinafter, exemplary embodiments of the present disclosure will be described in detail so as to be easily implemented by the skilled person in the art, with reference to the accompanying drawings. A description of the present disclosure is merely an exemplary embodiment for a structural or functional description and the scope of the present disclosure should not be construed as being limited by exemplary embodiments described in a text. That is, since the exemplary embodiment can be variously changed and have various forms, the scope of the present disclosure should be understood to include equivalents capable of realizing the technical spirit. Further, it should be understood that since a specific exemplary embodiment should not include all objects or effects or include only the effect, the scope of the present disclosure is not limited by the object or effect.

Meanings of terms described in the present disclosure should be understood as follows.

The terms "first", "second", and the like are used to differentiate a certain component from other components, but the scope of the rights should not be construed to be limited by the terms. For example, a first component may be referred to as a second component, and similarly, the second component may be referred to as the first component. It should be understood that, when it is described that a component is "connected to" the other component, the component may be directly connected to the other component or another component may be present therebetween. In contrast, it should be understood that when it is described that a component is "directly connected to" the other component, another component is not present therebetween. Meanwhile, other expressions describing the relationship between the components, that is, expressions such as "between" and "directly between" or "adjacent to" and "directly adjacent to" should be similarly interpreted.

It is to be understood that the singular expression encompasses a plurality of expressions unless the context clearly dictates otherwise and it should be understood that the term "including" or "having" indicates that a feature, a number, a step, an operation, a component, a part, or the combination thereof described in the specification is present, but does not exclude a possibility of presence or addition of one or more other features, numbers, steps, operations, components, parts or combinations thereof, in advance. Unless otherwise a singular form has a explicitly different meaning contextually, If it is not contrarily defined, all terms used herein have the same meanings as those generally understood by the skilled person in the art. Terms which are defined in a generally used dictionary should be interpreted to have the same meaning as the meaning in the context of the related art, and are not interpreted as an ideal meaning or excessively formal meanings unless clearly defined in the present disclosure.

Figure 1:
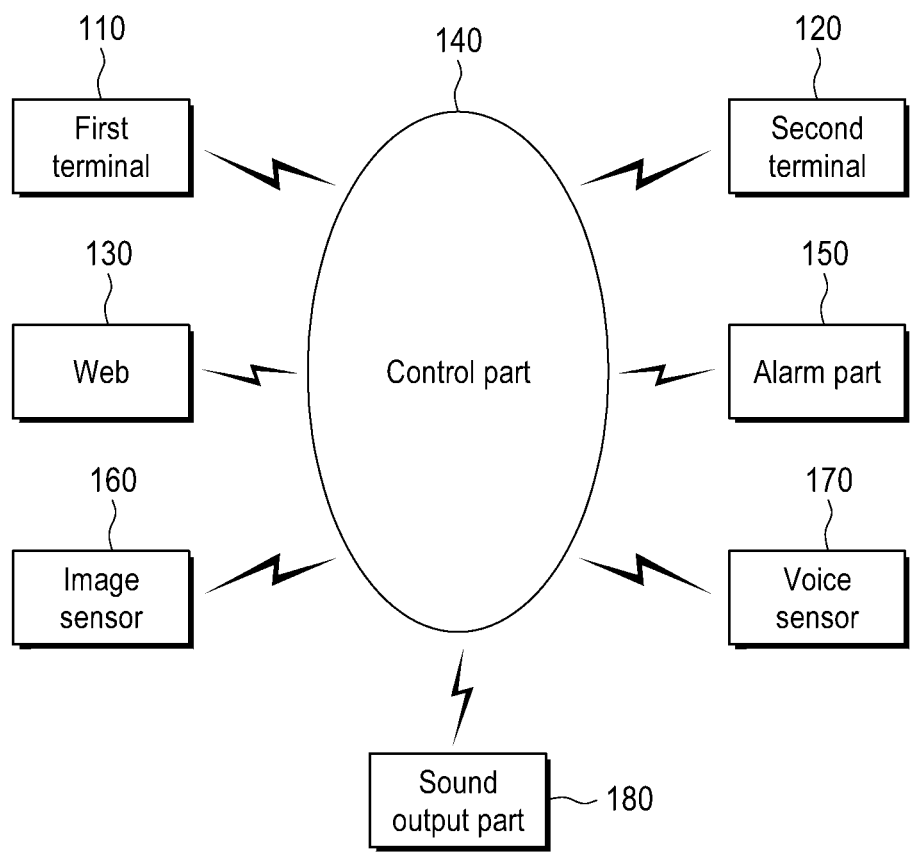
FIG. 1 is a view schematically showing an electronic configuration of a system for providing an interactive participation-type drawing making service according to an embodiment of the present disclosure.
Figure 2:
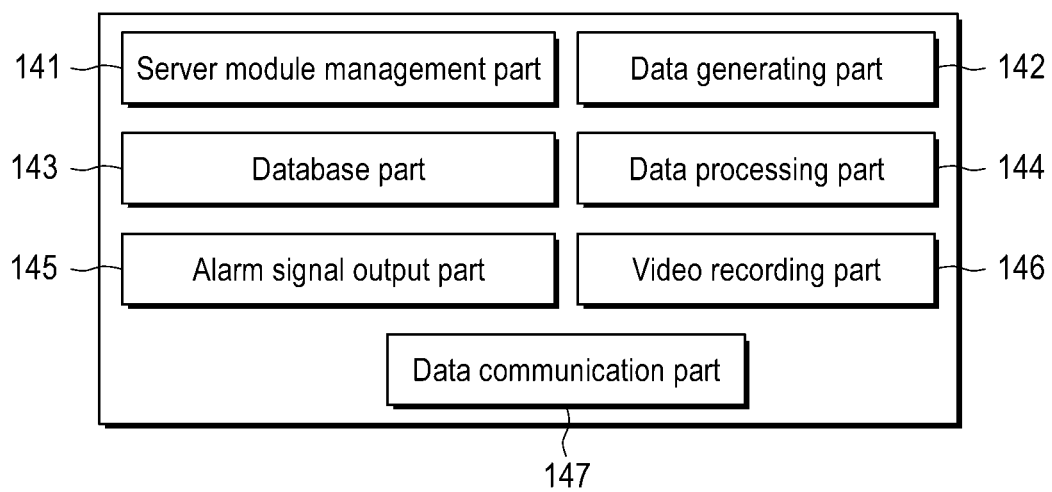
FIG. 2 is a block view of a configuration of a control part in the system for providing a drawing making service according to FIG. 1.
Figure 3:
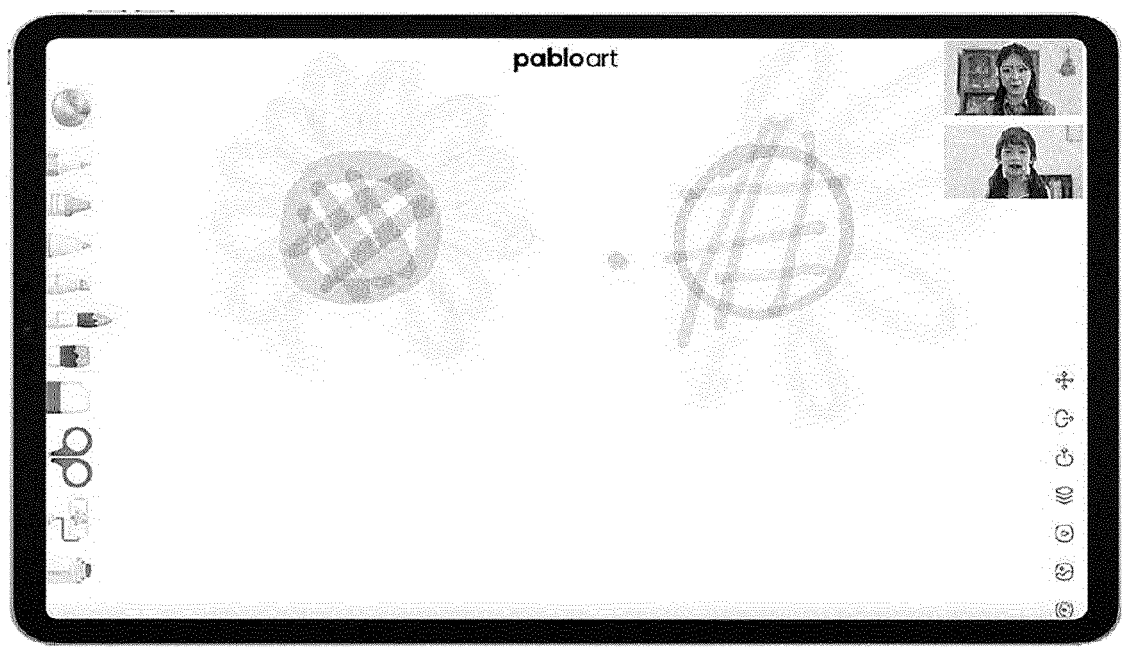
FIG. 3 is an image showing a terminal, an alarm part, an image sensor, a voice sensor and a sound output part in the system for providing a drawing making service according to FIG. 1.
Figure 4:
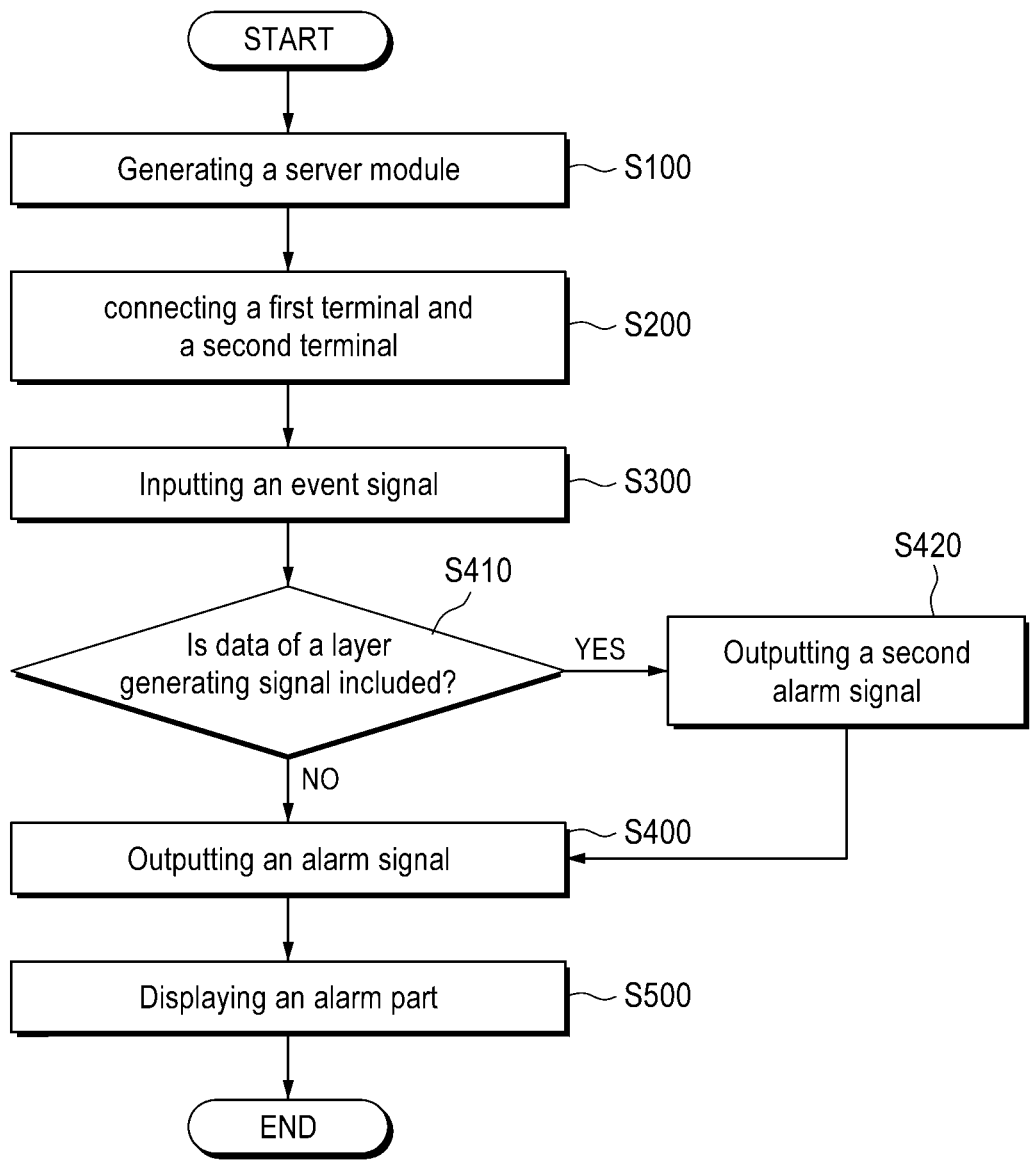
FIG. 4 is a flowchart showing a method for controlling a system for providing an interactive participation-type drawing making service according to an embodiment of the present disclosure.
Figure 5:
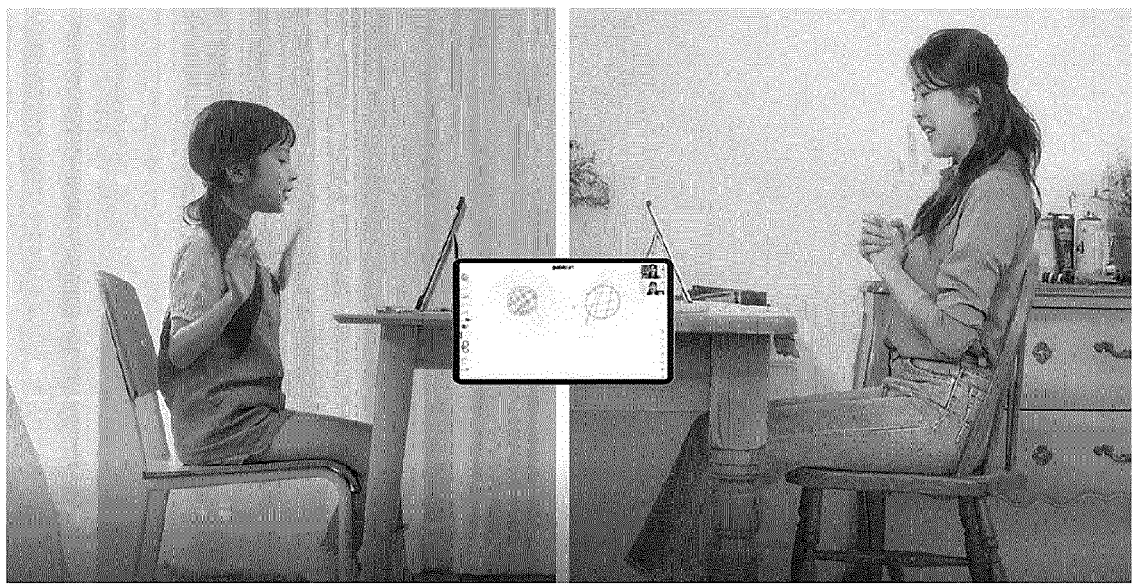
FIG. 5 is an image showing an embodiment that a teacher and a learner on remote locations perform art teaching and learning.
Figure 6:
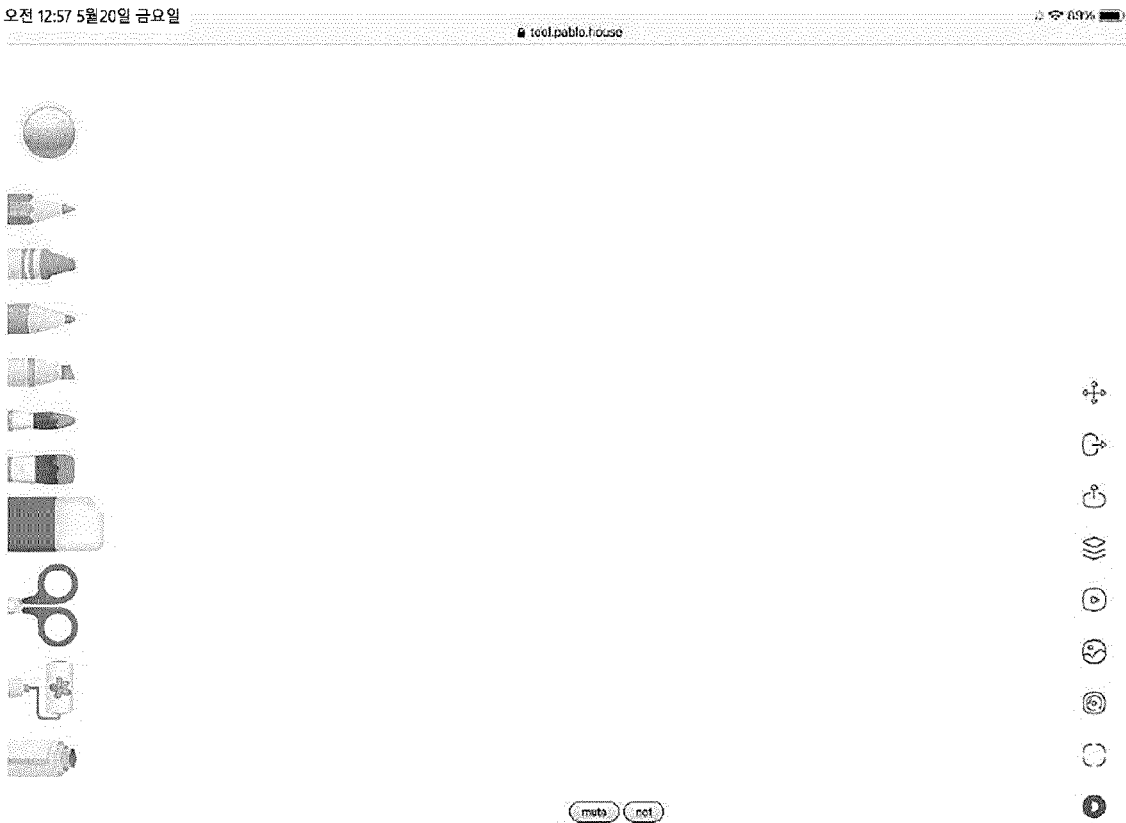
FIG. 6 is an image exemplarily showing that canvas and a drawing tool of a drawing making program are displayed on a screen of an alarm part.
Figure 7:
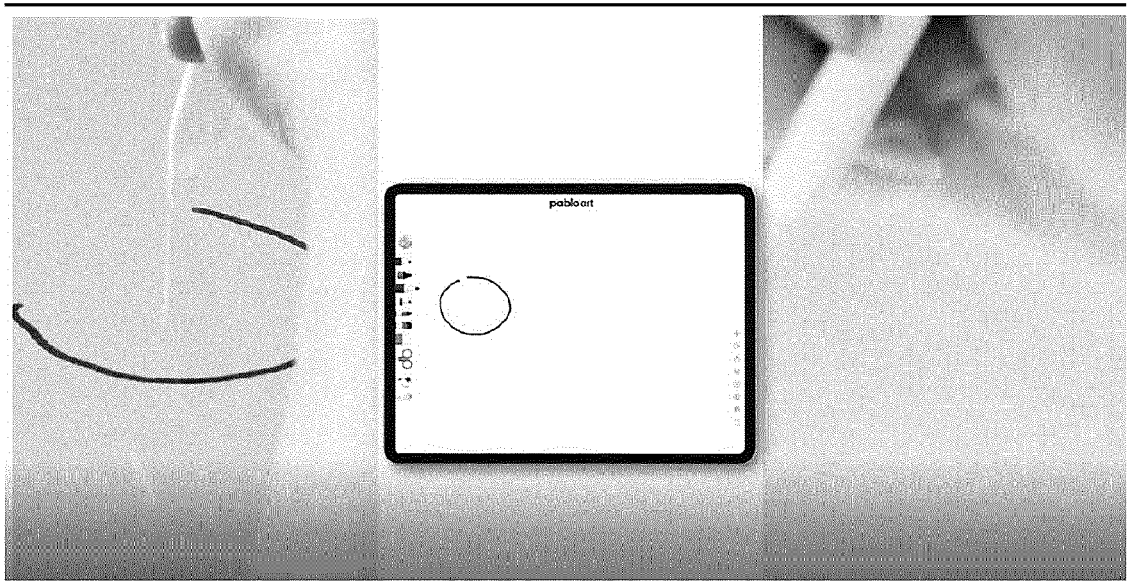
FIG. 7 is an image showing an embodiment that a user draws a drawing on a first layer.
Figure 8:
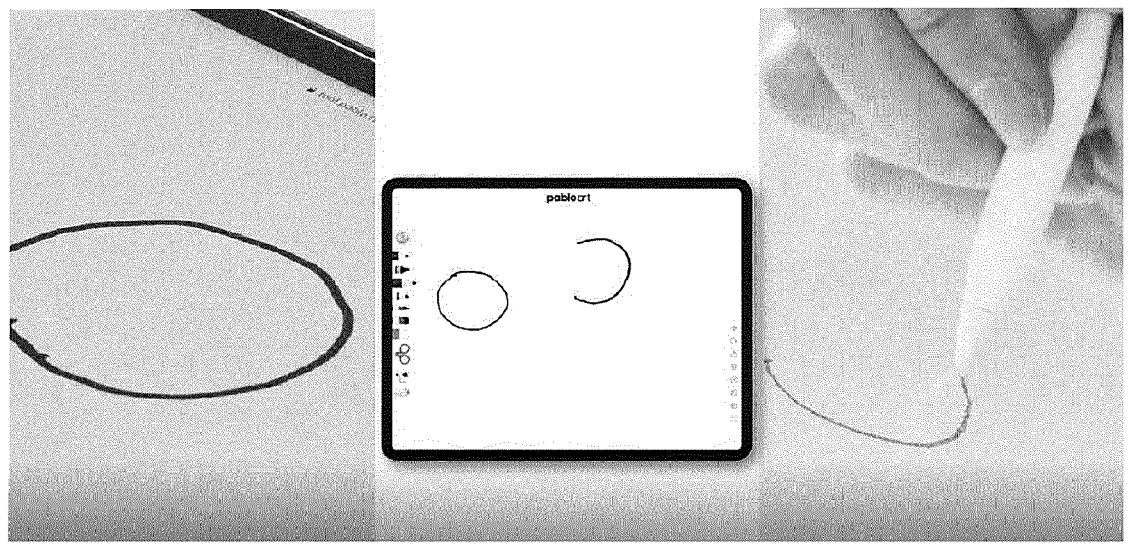
FIG. 8 is an image showing that a second user draws a drawing on a second layer imitating the drawing drawn on the first layer.
Figure 9:
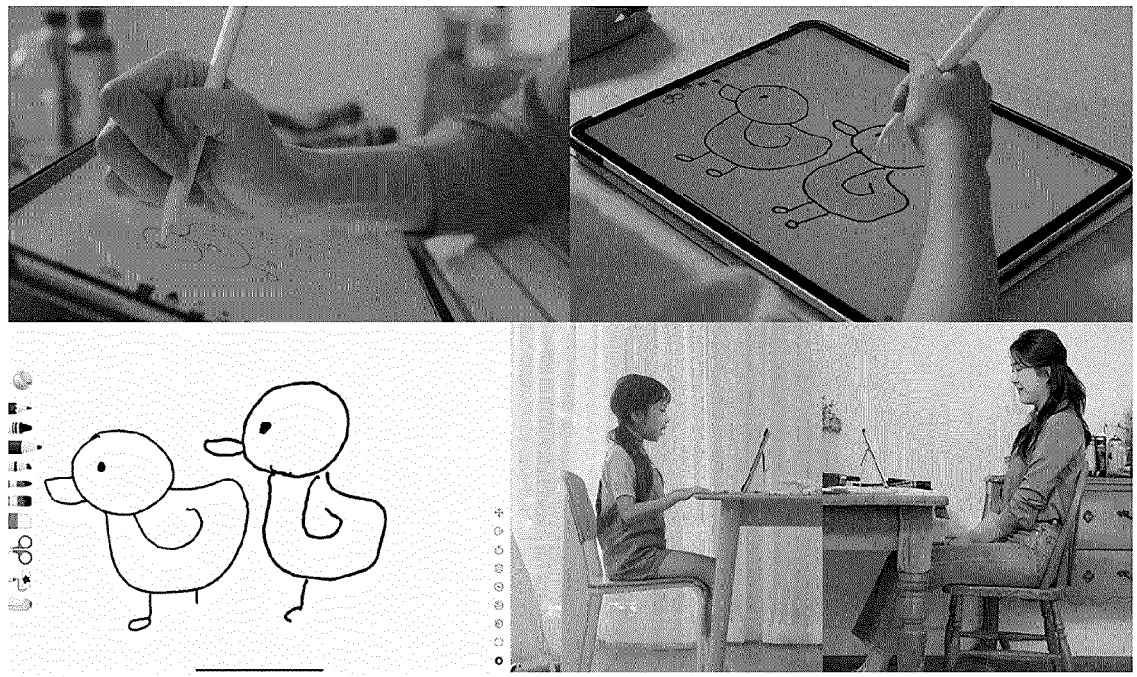
FIG. 9 is an image showing an embodiment that the embodiments of FIG. 7 and FIG. 8 are applied to a teacher and a learner.
Figure 10:
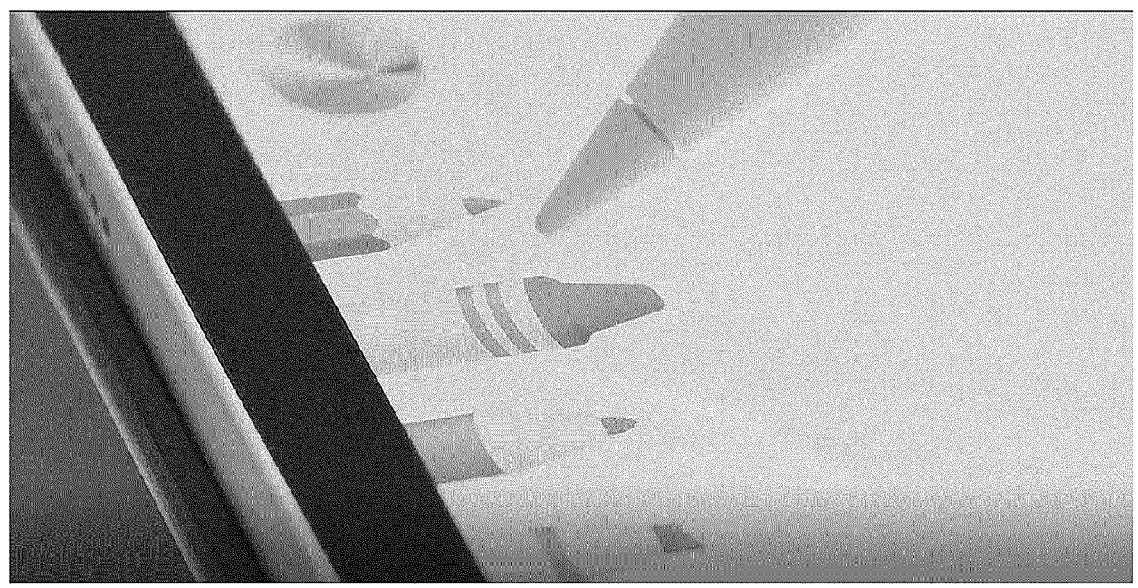
FIG. 10 is an image showing an embodiment that, as changing setting of an attribute of an icon forming a drawing tool, an icon having a size changed in response thereto is displayed.
Figure 11:
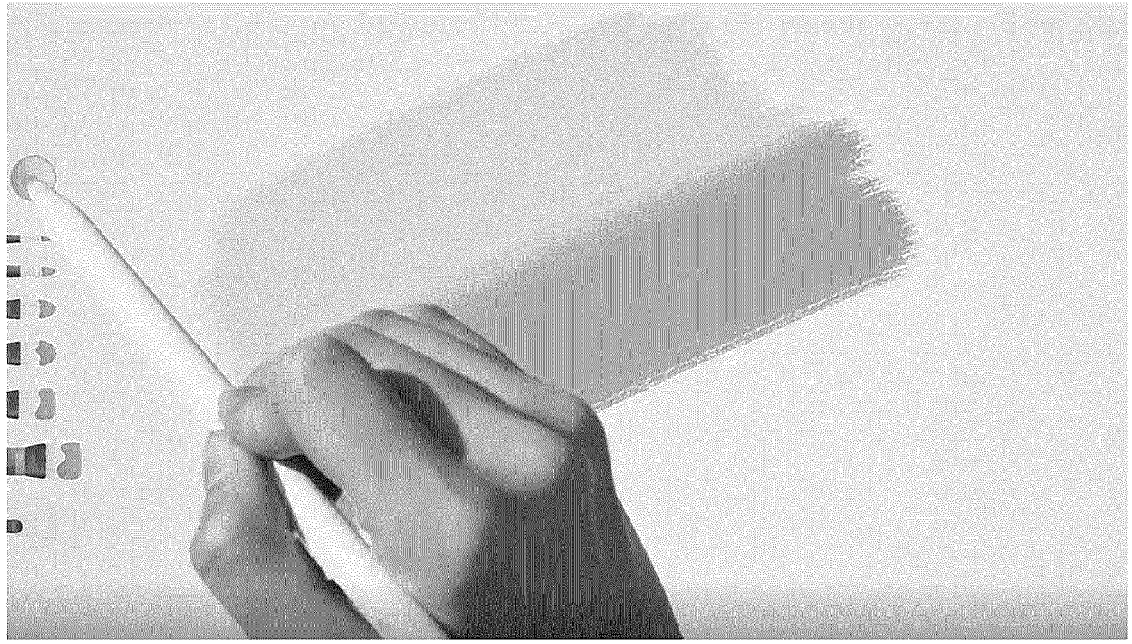
FIG. 11 to FIG. 19 are images showing embodiments that various artistic expressions are displayed by the drawing making program.
Figure 12:
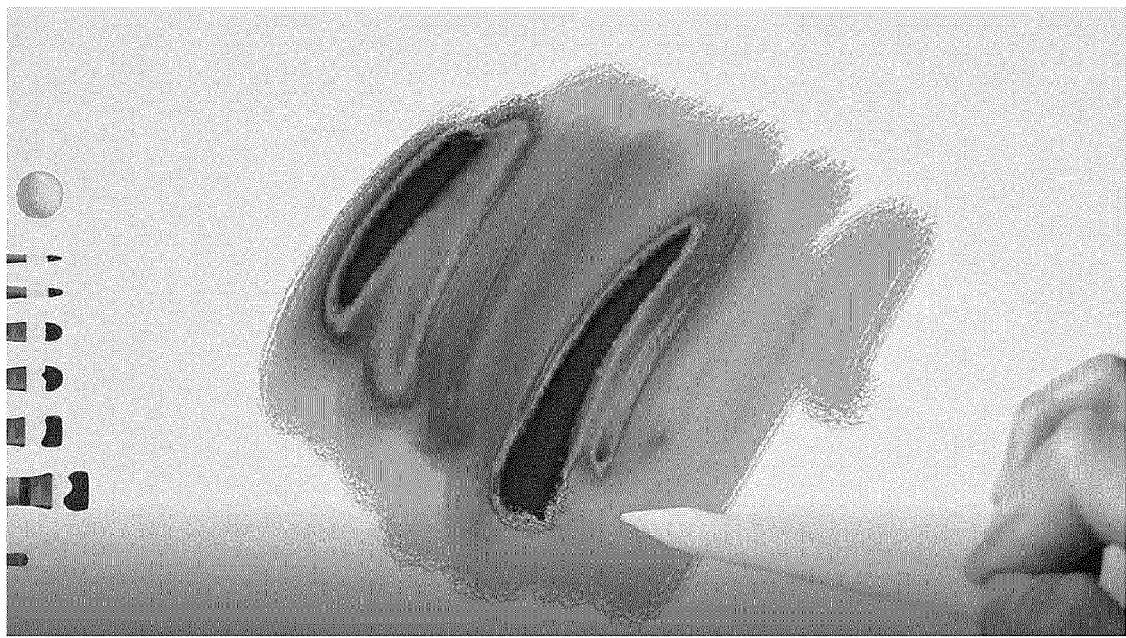
Figure 13:
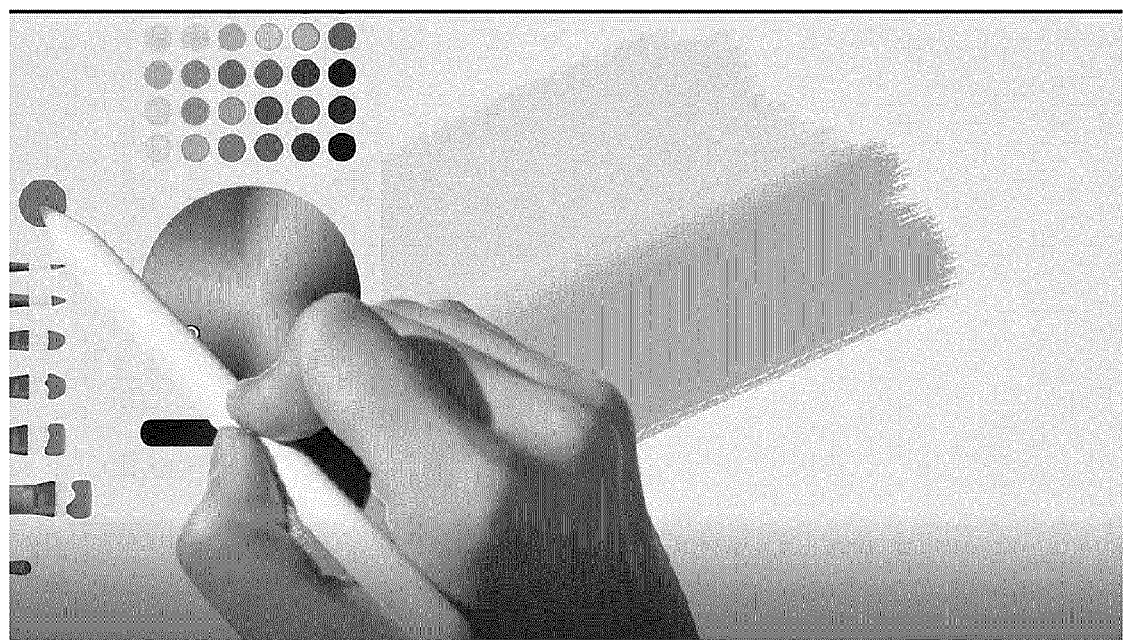
Figure 14:
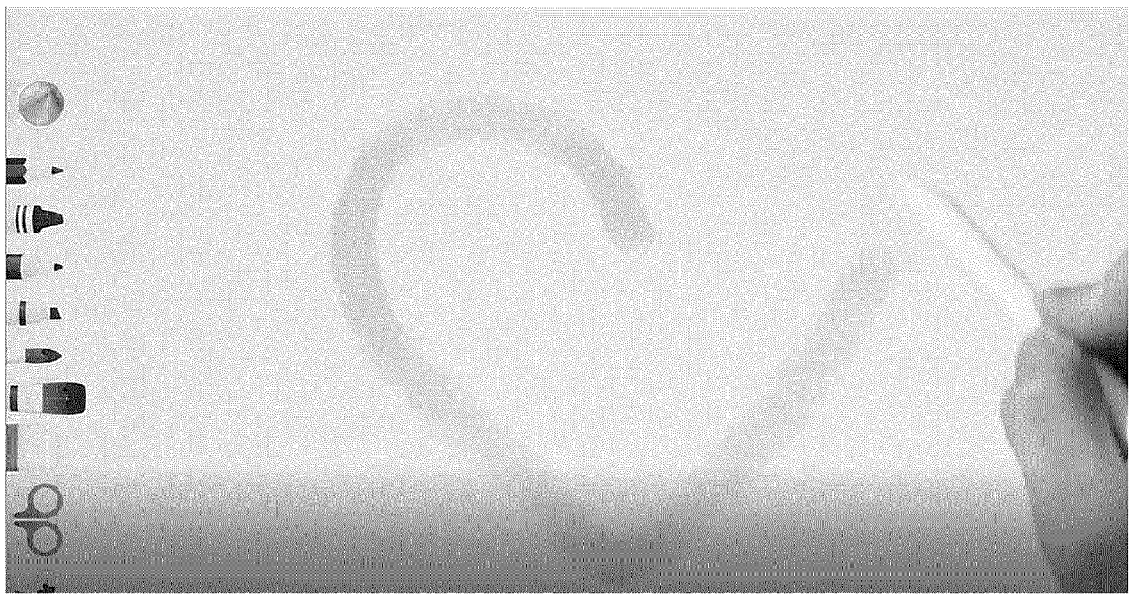
Figure 15:
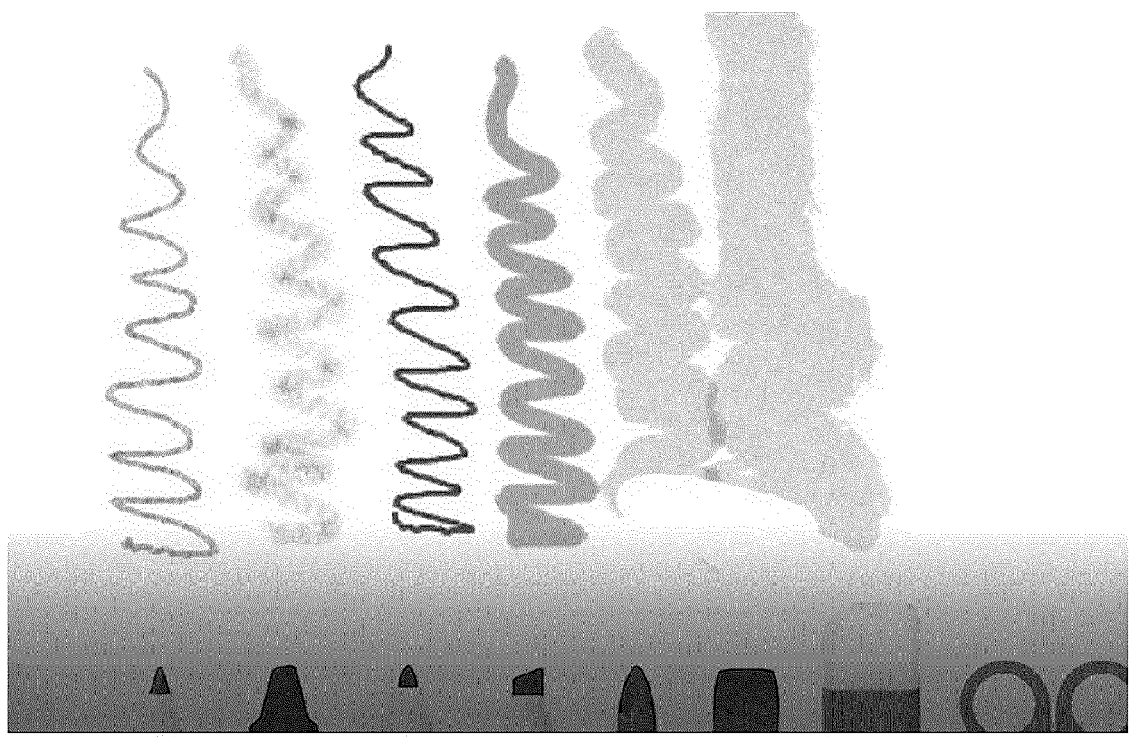
Figure 16:
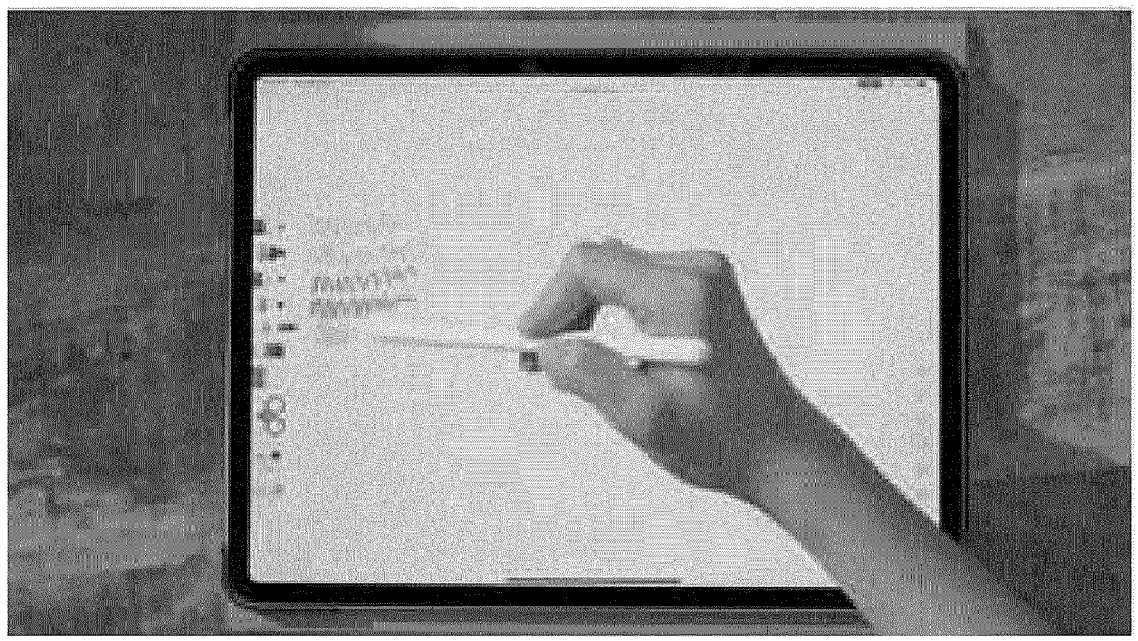
Figure 17:
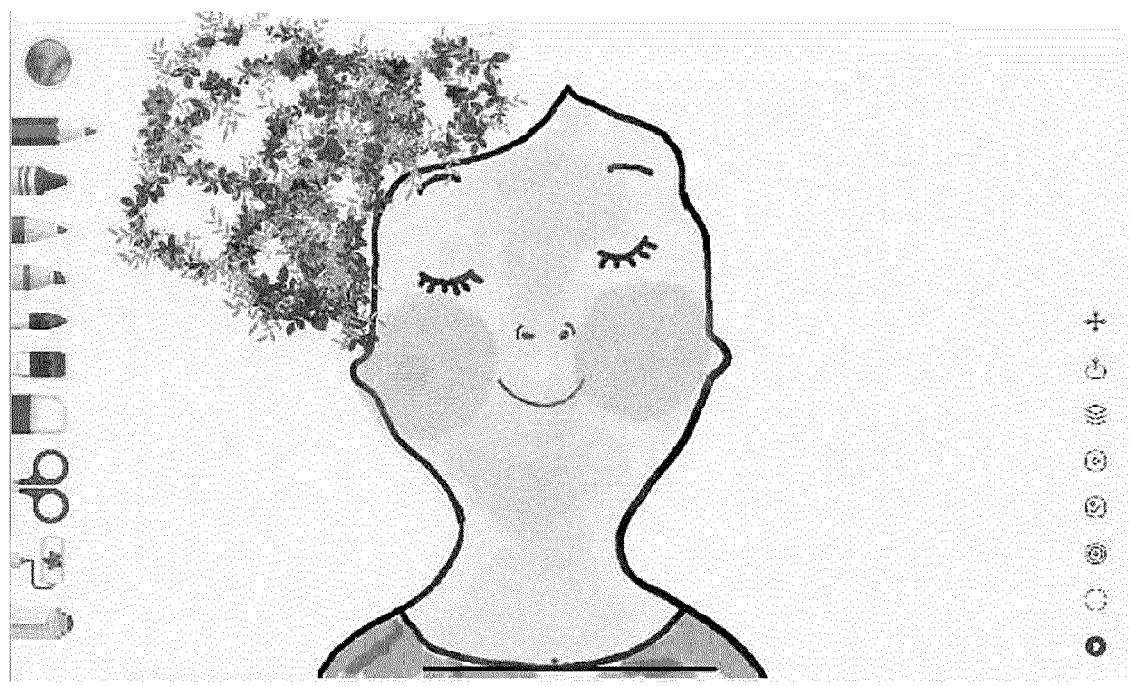
Figure 18:
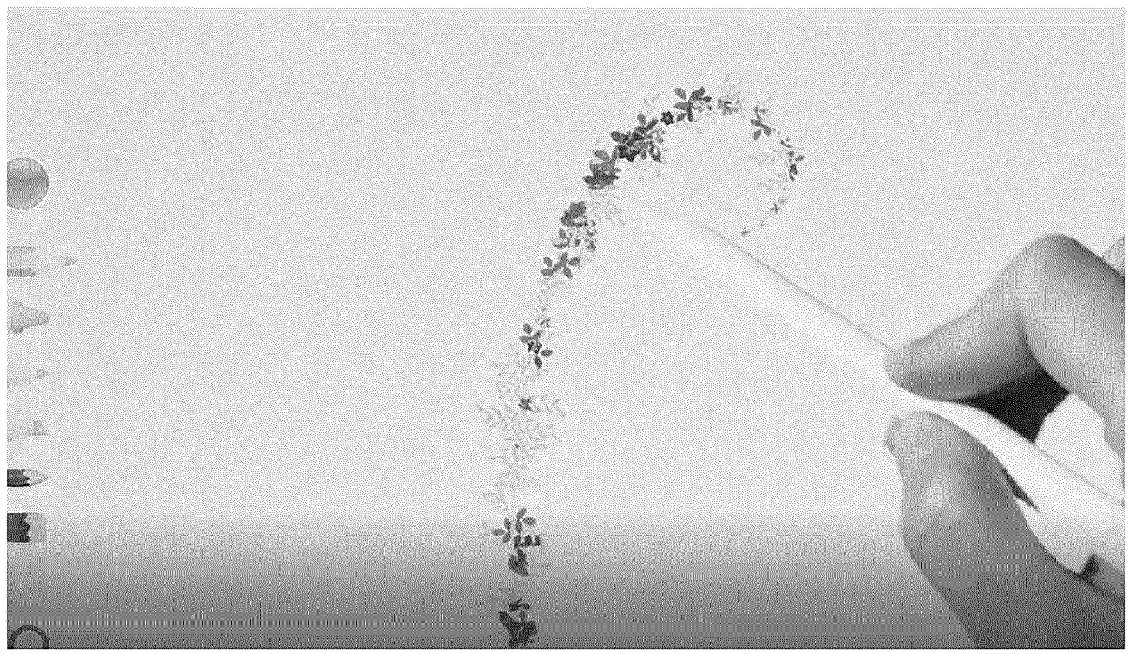

FIG. 1 is a view schematically showing an electronic configuration of a system for providing an interactive participation-type drawing making service according to an embodiment of the present disclosure. FIG. 2 is a block view of a configuration of a control part in the system for providing a drawing making service according to FIG. 1. FIG. 3 is an image showing a terminal, an alarm part, an image sensor, a voice sensor and a sound output part in the system for providing a drawing making service according to FIG. 1. FIG. 4 is a flowchart showing a method for controlling a system for providing an interactive participation-type drawing making service according to an embodiment of the present disclosure. FIG. 5 is an image showing an embodiment that a teacher and a learner on remote locations perform art teaching and learning. FIG. 6 is an image exemplarily showing that canvas and a drawing tool of a drawing making program are displayed on a screen of an alarm part. FIG. 7 is an image showing an embodiment that a user draws a drawing on a first layer. FIG. 8 is an image showing that a second user draws a drawing on a second layer imitating the drawing drawn on the first layer. FIG. 9 is an image showing an embodiment that the embodiments of FIG. 7 and FIG. 8 are applied to a teacher and a learner. FIG. 10 is an image showing an embodiment that, as changing setting of an attribute of an icon forming a drawing tool, an icon having a size changed in response thereto is displayed. FIG. 11 to FIG. 19 are images showing embodiments that various artistic expressions are displayed by the drawing making program.

As shown in FIG. 1 and FIG. 3, a system for providing an interactive participation-type drawing making service 100 is a remote-type system for providing an interactive participation-type drawing making service, which is capable of real-time interaction between a first user and a second user in a contactless environment. This may be configured to include a first terminal 110, a second terminal 120, a web 130, a control part 140 and an alarm part 150.

However, elements as illustrated in FIG. 1 and FIG. 3 fall in only a minimum configuration essential for the present disclosure. Thus, a system for providing a drawing making service may be implemented which has more additional elements.

The first terminal 110 is configured to include various known input devices (not illustrated) such as a keyboard, a pad, a mouse, etc. According to a preferable embodiment, this may be configured to be located on the first user's side, allowing inputting a first event signal of the first user, which is to be described hereinafter, into the web 130 and the control part 140.

Further, the second terminal 120 is configured to allow remote communication with the first terminal 110 described above and may have the same elements as those of the first terminal 110. According to the present disclosure, this is configured to be located on the second user's side, allowing inputting a second event signal of the second user into the web 130 and the control part 140 through the input device.

Wherein, a plurality of the first and second terminals 110 and 120 may be formed and preferably applied to a tablet. However, without a limit thereto, these may be also applied to a PC, a smart phone, etc.

Since the configuration of these first and second terminals 110 and 120 falls in an ordinary terminal device provided generally, the detailed configuration of those terminals is not illustrated in a drawing and more detailed descriptions thereof will be omitted.

The web 130 is an internet service that is configured to support multimedia such as a test, a graphic, an images, a sound, a video, etc. According to the present disclosure, this may be configured to be connected with the first and second terminals 110 and 120, allowing providing commonly known, various drawing making-related media to the first user and the second user who use each of the first and second terminals 110 and 120.

The control part 140 is a control service for serving a drawing making program to be described hereinafter. Preferably, it is preferred that this is configured to construct a network with the first and second terminals 110 and 120 and the web 130, allowing mutual communication.

According to the present disclosure, this control part 140 generates a server module for using a pre-stored drawing making program. When both of the first and second terminals 110 and 120 connect to a generated server module, this reflects all of each data resulting from real-time input of the first and second event signals to the drawing making program in real time, and performs a control function so as to output a preset alarm signal in response to a result of reflection. More particularly, referring to FIG. 2, the control part may be configured to include a server module management part 141, a database part 143, a data processing part 144 and an alarm signal output part 145.

Wherein, the drawing making program, as shown in FIG. 11 to FIG. 19, may be a graphic software that is configured to support an environment for performing drawing making using a drawing tool which is capable of an artistic expression of at least one of a dot, a line, a face, a shape, a color, light, texture and a sense of volume on canvas.

Further, according to the present disclosure, it is preferable that the event signal includes a making signal to express a drawing while occurring anyone of strokes of dragging and a touch (click) in a canvas region following selecting each icon forming the drawing tool on the drawing making program, and a layer generating signal demanding for partitioning the canvas region on the drawing making program into a plurality of layers L1 and L2 corresponding to the number of the terminal(s) 110 or/and 120.

The server module management part 141 generates and manages the server module for using the aforementioned drawing making program, and may be configured to assign identification information for each of the first and second terminals 110 and 120 when both of the first terminal 110 and the second terminal 120 connect to the server module.

The data generating part 142 performs a function to subject each of the first and second event signals that were input from the first and second terminals 110 and 120 respectively to datafication.

It is preferable that the database part 143 is configured to pre-store and manage the drawing making program for a real-time response according to data of the first and second event signals generated by the data generating part 142.

The data processing part 141 performs a function to perform mapping of the data of the first and second event signals generated by the data generating part 412 to the identification information assigned by the server module management part 141 followed by reflection to the drawing making program.

The alarm signal output part 145 performs a function to control a preset alarm signal so as to be output in response to a result of reflection through the data processing part 144.

Wherein, when data of the layer generating signal is included in the data of the event signal mapped through the data processing part 144, the alarm signal output part 145 may output a second alarm signal so as to provide a screen partitioned corresponding to the layer to the alarm part 150 of the terminal(s) 110 or/and 120 into which a relevant event signal was input.

Meanwhile, according to the present disclosure, the control part 140 may further include a video recording part 146 that performs datafication of a screen to be displayed through the alarm part (150), followed by recording and storing in the database 146.

At this time, the event signal may further include a replay-demand signal that demands for replaying a video of drawing making process already performed on a drawing making program.

Further, when data of the replay-demand signal is included in the data of the event signal mapped through the data processing part 144, the alarm signal output part 145 may output a third alarm signal so as to provide, as a video, the already performed, drawing making process to the alarm part 150 of the terminal(s) 110 or/and 120 into which a relevant event signal was input based on data stored in the database part 143 through the video recording part 146.

On the other hand, the drawing making program may be configured to allow setting a thickness of a first icon that expresses a formative element for a dot, a line and a face those having an arbitrary thickness in the drawing tool according to the event signal.

This setting of a thickness may be achieved by a stroke that touches (clicks) the first icon. At this time, as shown in FIG. 10, the alarm signal output part 145 may output a fourth alarm signal so as to provide the alarm part 150 with a screen on which a size of the first icon was activated in response to a dimension of the set thickness.

Further, the drawing making program may be configured to allow setting a color for a second icon that expresses a formative element for a color in a drawing tool according to the event signal.

This setting of a color may be achieved by a stroke that firstly touches (clicks) the second icon and then secondarily touches (clicks) a desired color. Wherein, the alarm signal output part 145 may output a fifth alarm signal so as to provide a screen on which at least a part of icons of the drawing tool including the second icon was activated to be the same color as a set color.

The alarm part 150 visually displays a texture and a preset image according to the alarm signal output from the alarm signal output part 145 of the control part 140 on an arbitrary screen. Preferably, it is preferable that this is configured to be equipped to each of the first terminal 110 of the first user and the second terminal 120 of the second user, respectively.

This alarm part (150) may be configured to include at least one of a liquid crystal display (LCD), a thin film transistor-liquid crystal display (TFT LCD), an organic light-emitting diode (OLED), a flexible display and a 3D display.

On the other hand, the system for providing a drawing making service 100 according to the present disclosure may be configured to further include: an image sensor 160 taking each image of the first and second users, respectively; a voice sensor 170 sensing each voice of the first and second users, respectively; and a sound output part 180 outputting a preset sound according to an alarm output from the control part 140, wherein each of these is further equipped to the first terminal 110 and the second terminal 120, respectively.

Wherein, the control part 140 may be configured to further include a data communication part 147 that allows sharing image data taken by the image sensor 160 and voice data sensed by the voice sensor 170 between the first and second terminals 110 and 120 mutually in real time using a pre-mounted video calling SDK (interface), and outputting the image data to the alarm part 150 via the alarm signal output part 145 and the voice data to the sound output part 180.

Figure 19:
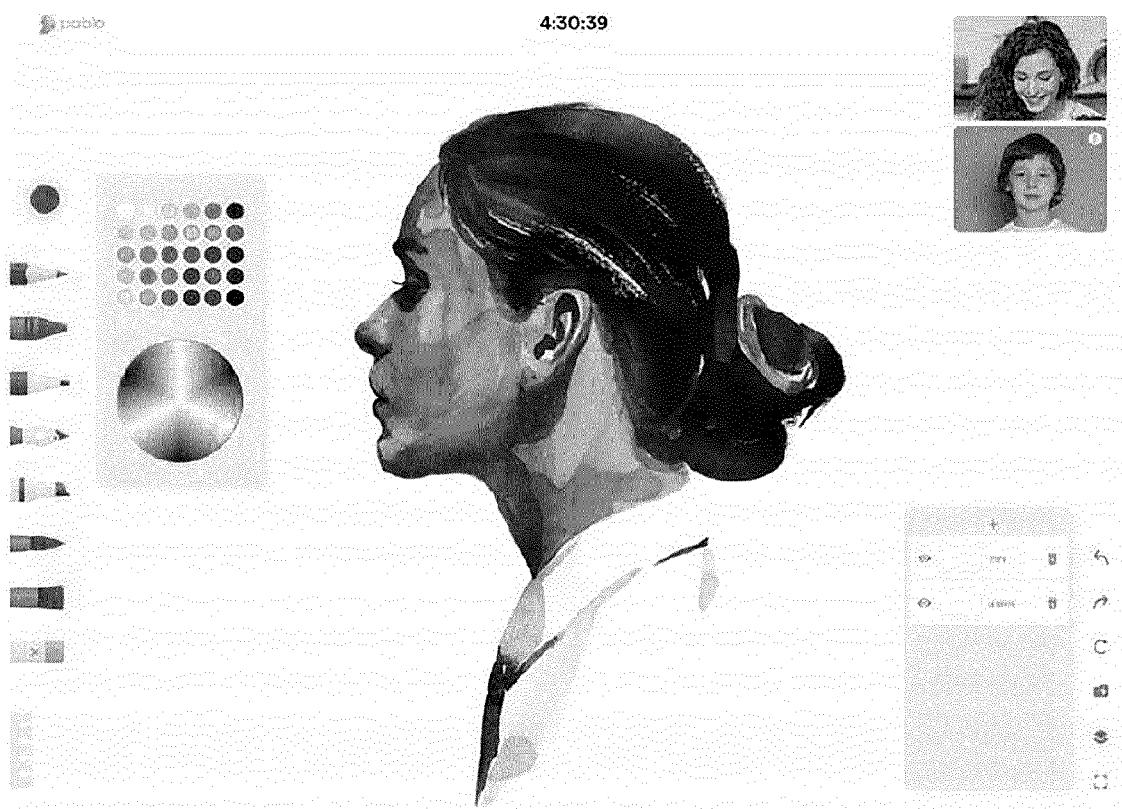

At this time, as shown in FIG. 3 and FIG. 19, the alarm signal output part 145 may output a sixth alarm signal so as to provide the alarm part 150 with a screen on which real-time images taking the first and second users are overlapped in a canvas region on the drawing making program, based on image data shared through the data communication part 147.

This overlapped, real-time image is configured to be located on an edge of the canvas region automatically. It is preferable that when a stroke dragging a part occurs, this is configured to be movable within the canvas region in response thereto.

Next, referring to FIG. 4, a method for controlling a system for providing a drawing making service 100 as configured above may be configured to include steps of: generating a server module S100; connecting a server module S200; inputting an event signal S300; outputting an alarm signal S400; and displaying an alarm part S500.

In the step of generating a server module S100, a control part 140 generates a sever module for using a drawing making that was program pre-stored.

In the step of connecting a server module S200, both of a first terminal 110 of a first user and a second terminal 120 of a second user are connected to the server module generated in the step of generating a server module S100.

In the step of inputting an event signal S300, a first event signal of the first user is input to the control part 140 through the first terminal 110 or a second event signal of the second user is input thereto through the second terminal 120. Alternatively, both of the first and second events signals are input to the control part 140.

In the step of outputting an alarm signal S400, the control part 140 reflects all of each data according to real-time input of the first and second event signals to a drawing making program in real time and controls a preset alarm signal so as to be output in response to a result of reflection.

Wherein, the step of outputting an alarm signal S400 may be configured to include steps of: detecting a layer generating signal in which the control part 140 determines whether data of a layer generating signal demanding for partitioning a canvas region on the drawing making program into a plurality of layers L1 and L2 corresponding to the number of the terminal(s) 110 or/and 120 is included or not S410, and when determining that data of the layer generating signal is included, outputting a second alarm signal in which the control part 140 outputs a second alarm signal so as to provide a screen partitioned corresponding to the layer the alarm part 150 of the terminal(s) 100 or/and 120 into which a relevant event signal was input S420.

In the step of displaying an alarm part S500, the alarm part 150 performs visual displaying on an arbitrary screen according to an alarm signal output by the control part 140 in the step of outputting an alarm signal.

Detailed descriptions of the preferred exemplary embodiments of the present disclosure disclosed as described above are provided so as for the skilled person in the art to implement and execute the present disclosure. The present disclosure has been described with reference to the preferred exemplary embodiments, but the skilled person in the art will understand that the present disclosure can be variously modified and changed without departing from the scope of the present disclosure. For example, the skilled person in the art may use the respective components disclosed in the exemplary embodiments by combining the respective components with each other. Therefore, the present disclosure is not limited to the exemplary embodiments described herein, but intends to grant the widest range which is coherent with the principles and new features disclosed herein.

The present disclosure may be embodied in other specific forms without departing from the spirit and essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure. The present disclosure is not limited to the exemplary embodiments described herein, but intends to grant the widest range which is coherent with the principles and new features presented herein. Further, the claims that are not expressly cited in the claims are combined to form an exemplary embodiment or be included in a new claim by an amendment after the application.

The invention claimed is:

1. A system for providing an interactive participation drawing making service, which provides a remote drawing making service that is capable of real-time interaction between a first user and a second user in a contactless environment, wherein the system comprises:
   a first terminal that is configured to allow inputting a first event signal of the first user;
   a second terminal that is configured to allow inputting a second event signal of the second user;
   a controller that generates a server module for using a pre-stored drawing making program while undergoing communication in the server module by constructing a network with the first and second terminals and a web, and reflects all data resulting from real-time input of the first and second event signals to the drawing making program in real time when both of the first and second terminals connect to the generated server module, and controls a preset alarm signal so as to be output in response to a result of the reflection; and
   an alarm part provided in each of the first and second terminals to perform visual displaying on an arbitrary screen according to an alarm signal output from the controller,
   wherein the controller comprises:
   a server module management processor that generates and manages the server module for using the drawing making program, and assigns identification information for each of the first and second terminals when the first terminal and the second terminal connect to the server module;
   a data generation processor that performs datafication of the first and second event signals input that were from the first and second terminals;
   a database that pre-stores and manages the drawing making program for making a real-time response according to data of the first and second event signals generated by the data generation processor;
   a data processor that performs mapping of the data of the first and second event signals generated by the data generation processor to the identification information assigned by the server module management processor, so as to reflect the data to the drawing making program; and
   an alarm signal output processor that controls a preset alarm signal so as to be output in response to the result of reflection through the data processor,
   wherein the controller further comprises a video recording processor that performs datafication of the screen displayed through the alarm part and records and stores the data in the database,
   wherein the at least one of the first event signal and the second event signal further comprises a replay-demand signal that replays a video of a drawing making process already performed on the drawing making program, and
   wherein when the data of the replay-demand signal is included in the data of the at least one of the first event signal and the second event signal mapped through the data processor, the alarm signal output processor outputs the alarm signal so as to provide, as the video, the already performed drawing making process to the alarm part of the terminal into which at least one of the first event signal and the second event signal was input based on the data stored in the database through the video recording processor, and
   wherein each of the first terminal and the second terminal further comprises:
   an image sensor that takes images from the first and second users, respectively, as image data;
   a voice sensor that senses voices of the first user and the second user, respectively, as voice data; and
   a sound output processor that outputs a preset sound according to the alarm signal output from the controller, and
   the controller further comprises a data communication processor that allows real-time mutual sharing of the image data taken by the image sensor and the voice data sensed by the voice sensor between the first and second terminals using a pre-mounted video calling software development kit (SDK) as an interface and outputs the image data to the alarm part via the alarm signal output processor and the voice data to the sound output processor.

2. The system for providing the interactive participation drawing making service of claim 1, wherein the drawing making program is a graphic software configured to support an environment for performing drawing making using a drawing tool that is capable of a pictorial expression of at least one of a dot, a line, a color, light, texture, and a sense of volume on canvas.

3. The system for providing the interactive participation drawing making service of claim 2, wherein at least one of the first event signal and the second event signal comprises:
   a making signal that expresses a drawing while generating any one stroke of dragging and a touch to a canvas region following a selection of each icon forming the drawing tool on the drawing making program by receiving from the first terminal or the second terminal the selected icon; and
   a layer generating signal that demands for partitioning the canvas region on the drawing making program into a plurality of layers corresponding to a number of the terminals.

4. The system for providing the interactive participation drawing making service of claim 1, wherein when the data of the layer generating signal is included in the data of at least one of first event signal and second event signal mapped through the data processing part, the alarm signal output processor outputs the alarm signal so as to provide a screen partitioned corresponding to the layer of the terminal into which the at least one of first event signal and second event signal was input.

5. The system for providing the interactive participation drawing making service of claim 1, wherein the drawing making program is configured to allow setting a thickness for a first icon that expresses a formative element for a dot, a line and a face having an arbitrary thickness in the drawing tool according to the at least one of the first event signal and the second event signal, the setting of the thickness is achieved by a stroke touching the first icon, and the alarm signal output processor outputs the alarm signal so as to provide the alarm part with a screen on which a size of the first icon was activated corresponding to a dimension of a set thickness.

6. The system for providing the interactive participation-type drawing making service of claim 1,
   wherein the drawing making program is configured to allow setting a color for a second icon that expresses a formative element for the color in the drawing tool according to the at least one of the first event signal and the second event signal, the setting of the color is achieved by firstly touching the second icon and then secondarily touching a desired color, and the alarm signal output processor outputs the alarm signal so as to provide the alarm part with a screen on which at least one of the icons of the drawing tool including the second icon was activated to be a same color as a set color.

7. The system for providing the interactive participation-type drawing making service of claim 1, wherein:

the alarm signal output processor outputs the alarm signal so as to provide the alarm part with a screen on which real-time images taking the first and second users are overlapped in the canvas region on the drawing making program, based on the image data shared through the data communication processor, and an overlapped, real-time image is configured to be located on an edge of the canvas region automatically, and when a stroke dragging a part occurs, the part is also configured to be movable within the canvas region in response to the stroke dragging the part.

* * * * *